(12) United States Patent
Kienzle et al.

(10) Patent No.: US 7,675,473 B2
(45) Date of Patent: Mar. 9, 2010

(54) PARABOLIC ANTENNA WITH RINSING CONNECTION

(75) Inventors: Klaus Kienzle, Zell a. H. (DE); Fritz Lenk, Schiltach (DE)

(73) Assignee: Vega Grieshaber KG, Wolfach (DE)

( * ) Notice: Subject to any disclaimer, the term of this patent is extended or adjusted under 35 U.S.C. 154(b) by 498 days.

(21) Appl. No.: 11/580,420

(22) Filed: Oct. 12, 2006

(65) Prior Publication Data

US 2007/0085752 A1    Apr. 19, 2007

Related U.S. Application Data

(60) Provisional application No. 60/726,863, filed on Oct. 14, 2005.

(30) Foreign Application Priority Data

Oct. 14, 2005    (DE) .................. 10 2005 049 243

(51) Int. Cl.
*H01Q 19/12* (2006.01)
(52) U.S. Cl. .................... 343/840; 343/779; 343/785 R
(58) Field of Classification Search ................ 343/840, 343/881, 915, 775, 779, 781 R, 786
See application file for complete search history.

(56) References Cited

U.S. PATENT DOCUMENTS 5,614,831 A *  3/1997  Edvardsson ................. 324/642

5,926,152 A *  7/1999  Schneider ................... 343/915
2006/0005621 A1*  1/2006  Lenk ........................ 73/290 V
2006/0017640 A1  1/2006  Kienzle et al.

FOREIGN PATENT DOCUMENTS

| DE | 10 2004 033 033 | 2/2006 |
| DE | 10 2004 035 083 | 2/2006 |
| EP | 0132 296 | 1/1985 |
| EP | 0 809 324 | 11/1997 |
| JP | 61026305 | 2/1986 |
| WO | 2006/063930 | 6/2006 |

* cited by examiner

*Primary Examiner*—Douglas W. Owens
*Assistant Examiner*—Chuc Tran
(74) *Attorney, Agent, or Firm*—Fay Kaplun & Marcin, LLP

(57) ABSTRACT

Contamination at the exciter of a parabolic antenna can lead to impaired signal quality, or even system downtime. A parabolic antenna is described which in addition to a parabolic reflector and an exciter has a rinsing device, which is configured so as to rinse and clean the exciter with rinsing agent or protect it from contaminants. Herein, the rinsing agent is injected, dropped, or else blown from a rinsing outlet in an outlet member at the parabolic reflector onto the exciter. Mounting the rinsing outlet directly to the parabolic reflector allows for the exciter to be cleaned from the parabolic reflector.

23 Claims, 6 Drawing Sheets

PARABOLIC ANTENNA WITH RINSING CONNECTION

RELATED APPLICATIONS

This application claims the benefit of the filing date of United States Provisional Patent Application No. 60/726,863 filed Oct. 14, 2005, and of German Patent Application No. 10 2005 049 243.6 filed Oct. 14, 2005, the disclosures of which are hereby incorporated herein by reference.

TECHNICAL FIELD

This invention relates to level measuring. In particular, the present invention relates to a parabolic antenna for a level radar, a level radar comprising such a parabolic antenna, the utilization of such a parabolic antenna for level measuring, and a method for measuring a level with a parabolic antenna.

BACKGROUND TO THE INVENTION

Known level measuring instruments have a parabolic antenna, which emits or receives radar or microwaves for determining the filling level of a medium in a filling material container. In this case, the parabolic antenna of such a level measuring instrument is arranged e.g. inside a container.

The quality of the measuring signals received at level measuring with a level radar having a parabolic antenna largely depends on the quality of the transmitting-receiving unit. In particular, contamination of the antenna feed or the exciter, which may be caused e.g. by filling material dust or liquid, may significantly deteriorate the quality of measuring results. In the extreme case, serious contamination of the exciter (which by the way may also be used as a radiation receiver) may even lead to no signals being transmitted at all.

SUMMARY OF THE INVENTION

According to an exemplary embodiment of the present invention a parabolic antenna for a level radar is provided, the parabolic antenna comprising a parabolic reflector, an exciter for emitting electromagnetic waves to the parabolic reflector, an outlet member and a rinsing device with a rinsing outlet for rinsing the exciter with a rinsing agent, wherein the rinsing outlet is mounted in the outlet member, and wherein the outlet member is mounted at the parabolic reflector.

Thus, apart from the parabolic reflector and exciter, the parabolic antenna according to the invention has a rinsing device, which may be configured so as to rinse and clean the exciter with rinsing agent or protect it from contaminants. Herein, the rinsing agent is injected, dropped, or else blown from a rinsing outlet in an outlet member at the parabolic reflector onto the exciter. By mounting the rinsing outlet, which may be configured e.g. in the shape of outlet nozzles, directly at the parabolic reflector the exciter may be cleaned from the parabolic reflector. In this case, the outlet member may be mounted at the parabolic reflector after production of the parabolic reflector, or else it may be produced as one piece with the parabolic reflector. Also, the outlet member may be mounted on a wave guide, which is joined to the exciter/receiver.

The outlet member may be produced independently from shape and size of the parabolic reflector. The rinsing ports and the number of rinsing channels may be designed according to the implemented exciter so that the most efficient cleaning effect is obtained. The central position of the outlet member may be the shortest possible distance from the exciter.

Thereby, simple and inexpensive individual manufacturing of the level radar or antenna may be possible, in that during final assembly, various antenna systems are equipped with corresponding individual outlet members. This may allow for high flexibility at low production cost.

Also, the diffusing panel according to the invention may allow for high stability of the junction between wave guide and parabolic reflector. E.g. the diffusing panel may be screwed to the wave guide and welded to the parabolic reflector.

Thus, exact fill level measuring even under unclean environmental conditions may be provided.

According to another sample embodiment of the present invention the rinsing device has a rinsing channel, wherein the rinsing channel is configured for conducting the rinsing agent to the rinsing outlet, and wherein the rinsing outlet is configured for letting the rinsing agent out towards the exciter.

E.g. the rinsing channel may be mounted inside an antenna coupling (which is configured as a wave guide). The rinsing channel is thus integrated into the antenna coupling, and is consequently configured during the production process of the antenna coupling.

According to another exemplary embodiment of the present invention the rinsing device also has a rinsing connection, wherein the rinsing connection is configured for connecting the rinsing device to a rinsing agent reservoir.

Herein, the rinsing connection is joined to the rinsing channel so that rinsing agent is conducted from the reservoir via the rinsing connection and the rinsing channel (i.e. directly through the antenna coupling) to the rinsing outlet.

According to another exemplary embodiment of the present invention the outlet member is embodied as a ring, wherein the ring is mounted centrically to the parabolic reflector.

Due to the rotationally symmetrical configuration of the outlet member and the centrical mounting of the outlet member to the parabolic reflector, a globally rotationally symmetric and simple construction of the parabolic antenna may be ensured. The recess in the middle of the ring may allow a wave guide to be guided through the ring. In this case, the ring may be mounted directly to the wave guide.

It should be noted that the outlet member may also have other shapes. E.g. a rectangular, pyramidal, or oval configuration may be possible.

According to another exemplary embodiment of the present invention the rinsing outlet is configured as a plurality of bores in the ring, which communicate with the rinsing channel.

Thereby several nozzles may be provided, through which the rinsing agent may be vaporized or blown onto the exciter.

According to another exemplary embodiment of the present invention the parabolic antenna has an antenna coupling, wherein the rinsing connection is threaded for screwing into the antenna coupling.

According to this exemplary embodiment of the present invention the thread may exemplary ensure easy mounting of the rinsing connection to the antenna coupling.

According to another exemplary embodiment of the present invention the rinsing device has a check valve, wherein the check valve is configured for preventing return mass transport.

Thereby it may be prevented that when e.g. the pressure of the rinsing agent drops under a predetermined value, the junction between the outside (rinsing agent reservoir) and the container inside (rinsing outlet) stays open. Thereby e.g. explosion protection may be created.

According to another exemplary embodiment of the present invention the check valve has a spring member and a ball.

Spring member and ball provide a simple but efficient check system.

The rinsing device may be configured on the one hand for preventing contamination of the exciter, and on the other hand for cleaning the exciter after contamination.

E.g. the exciter may comprise a Teflon cone.

According to another exemplary embodiment of the present invention, the rinsing agent may be air, nitrogen, or water. As required, it may also be possible to add cleansing agents. Also, the rinsing agent may be heated in order to enhance the cleaning effect. Possibly the rinsing agent may be vaporized onto the exciter under high pressure. Of course, using other rinsing agents may also be possible, such as for instance natural gases, or else reactive mixtures, which may further enhance the cleaning effect According to another exemplary embodiment of the present invention the electromagnetic waves emitted by the exciter are first electromagnetic waves, wherein the parabolic reflector is configured for concentrating the first electromagnetic waves.

According to another exemplary embodiment of the present invention the outlet member is configured as a diffusing panel, wherein the electromagnetic waves emitted by the exciter comprise second electromagnetic waves, and wherein the diffusing panel is configured for laterally removing the second electromagnetic waves past the exciter.

It may thus be possible for undesirable radiation from the outlet member to be removed laterally or dispersed so that it does not reach the exciter, and thus cannot deteriorate or falsify the measuring result.

The quality of the measurement may thus be increased in two ways. On the one hand, it may be ensured that the exciter is always clean and free of contaminants. On the other hand, it may be ensured that interfering radiation is dispersed away from the exciter and thus no longer supplied to the measuring and analysis electronic unit.

According to another exemplary embodiment of the present invention the diffusing panel has a conical shape with a rotational axis, so that a beam of parallel rays incident on the diffusing panel towards the rotational axis is guided away from the rotational axis via a backscattering process.

The conical shape may allow e.g. for the parallel rays, which are incident on the diffusing panel, to be globally guided away under the same angle to the rotational axis of the parabolic antenna. Such a conical diffusing panel may easily be manufactured. Thus, production and manufacturing cost may be reduced.

According to another exemplary embodiment of the present invention a level radar is provided, which comprises a parabolic antenna described above.

Moreover, the utilization of a parabolic antenna according to the invention for level measuring is provided.

Moreover, a method for measuring a level with a parabolic antenna is provided, wherein electromagnetic waves are emitted to a parabolic reflector by means of an exciter, rinsing agent is let out via a rinsing device with a rinsing outlet to the exciter, and the exciter is rinsed with the rinsing agent. Herein, the rinsing outlet is mounted in an outlet member, which is mounted to the parabolic reflector.

Thereby, a method is provided, which may allow for the quality of the measuring signals to be maintained even under adverse environmental conditions, in that the exciter/receiver is rinsed with rinsing agent for cleaning.

According to another exemplary embodiment of the present invention the rinsing agent is introduced from a rinsing agent reservoir into a rinsing connection of the rinsing device, and then transmitted from the rinsing connection to the rinsing outlet through a rinsing channel.

Other sample embodiments, tasks, and advantages of the invention result from the dependent claims.

BRIEF DESCRIPTION OF THE DRAWINGS

Hereafter, with reference to the figures, sample embodiments of the present invention will be described.

DETAILED DESCRIPTION OF EXEMPLARY EMBODIMENTS

Figure 1:
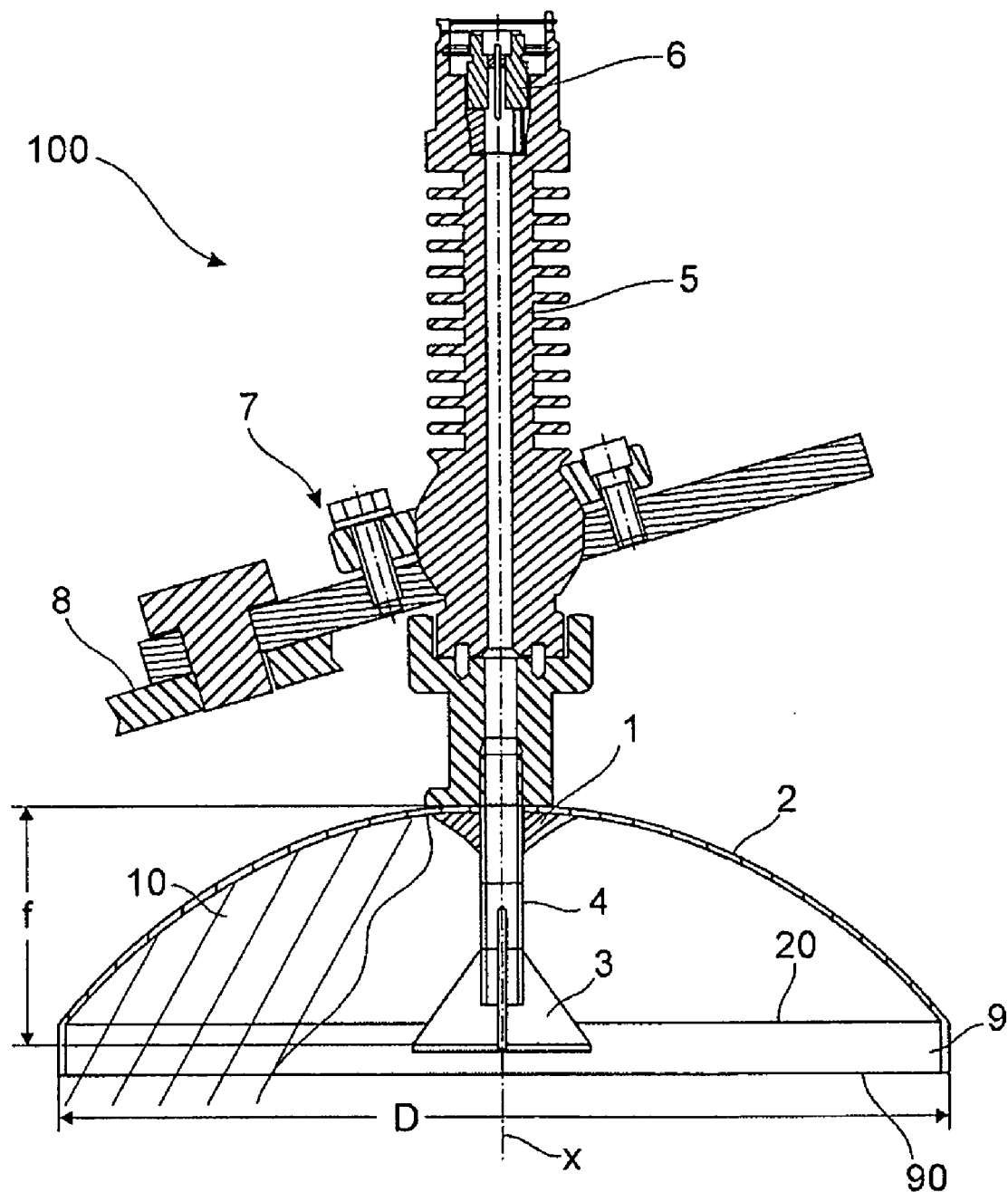
FIG. 1 shows a cross-sectional view of a parabolic antenna according to an exemplary embodiment of the present invention.

In the following description of the figures, the same reference numerals will be used for like or similar elements.

FIG. 1 shows a schematic cross-sectional view of a parabolic antenna according to an exemplary embodiment of the present invention. As may be seen in FIG. 1, the parabolic antenna 100 is substantially composed of a parabolic reflector 2 with a diffusing panel 1 and an exciter/receiver 3. Herein, the parabolic reflector 2 comprises a rotary parabolic reflector edge 20. The parabolic reflector edge 20 transitions into an additional collar 9 with an outside collar edge 90. Herein, the wall of the collar 9 extends approximately axially in parallel to a central parabolic reflector axis X of the parabolic reflector 2.

Furthermore, the parabolic antenna 100 comprises the exciter and/or receiver 3, which is arranged on the parabolic reflector axis X, and is spaced away from the backside wall of the parabolic reflector 2 with a wave-guiding member, e.g. an antenna tube or wave guide 4. The wave guide 4 transitions at the back to a wave guide array of at least one wave guide 5, at the rear end section of which a connector 6 for a transmitting-receiving device is arranged. The transmitting-receiving device comprises an electronic unit and components for generating an electromagnetic wave, in particular a radar or microwave.

The thus generated electromagnetic wave is transmitted from the connector 6 through wave guide 5 and wave guide 4 to the exciter 3. From the exciter 3 the wave is radiated towards the parabolic reflector, and reflected thereby in an axially parallel direction to the parabolic reflector axis X.

When the thus emitted electromagnetic wave has reached some filling material, the wave is reflected by the filling material, and in general, received at least partially by the parabolic reflector 2. The wall of the parabolic reflector 2 reflects the back reflected wave portions to the receiver 3 of the exciter/receiver assembly 3. From the receiver 3 the wave received is transmitted via wave guide 4 and wave guide 5 through the connector 6 to the receiving device of the transmitting-receiving device and picked up therein. The electronic unit of the transmitting-receiving device or another, downstream analysis device determines the time difference between emission of the electromagnetic wave and receipt of the electromagnetic wave reflected by the filling material or surface. Therefrom, the level of the filling material in a container may be determined.

For fixing the parabolic antenna 100 in a container wall, in particular in a container flange 8, the backside components at the wave guide 5 have a fastening device 7, e.g. with a flange. The exciter/receiver 3 lies within the assembly composed of parabolic reflector 2 and collar 9, so that the exciter/receiver 3 is partially arranged within the parabolic reflector edge 20 and partially outside the parabolic reflector edge 20. One portion of the exciter/receiver 3 protrudes into the area of the parabolic reflector 2, and another portion protrudes from the area of the parabolic reflector 2, into the area of the collar 9. In the embodiment represented in FIG. 1 the exciter/receiver 3 is arranged completely within the inside defined by the collar edge 9 and the parabolic reflector 2.

Thereby, the exciter/receiver 3 may mechanically be protected. Furthermore, with full illumination, side lobes and back lobes, which are undesirable secondary lobes e.g. due to spillover of the parabolic reflector 2, may be avoided as much as possible.

According to a sample embodiment of the present invention the ratio of focal distance f to diameter D of the parabolic antenna is 0.27. However, totally different values, either greater or smaller, may be equally possible.

Moreover, an integral configuration in one piece of parabolic reflector 2 and collar 9 may be possible. Optionally, the collar 9 may be made of the same material as the parabolic reflector 2, or of another material different therefrom. In particular, an inside coating or a complete collar material for absorbing electromagnetic waves incident on the inner wall of collar 9 may be possible.

For further reducing interfering reflections and minimizing or decreasing the ringing behavior at close range, a diffusing panel 1 is arranged in the middle of the parabolic reflector 2, which laterally removes electromagnetic waves emitted by the exciter 3 so that the reflected waves can no longer reach the exciter 3. As can be seen in FIG. 1, the diffusing panel 1 herein has such a shape that rays incident from the exciter 3 on the diffusing panel 1 are reflected away from the rotational axis X. Thereby, the ringing behavior at close range may be reduced significantly. In this case, the shape of the diffusing panel 1 may not necessarily be conical, it may only be essential that it has a slope with respect to the plane perpendicular to the rotational axis X so that axially parallel rays are scattered away. Alternatively or additionally, the diffusing panel 1 may be made of a radiation absorbing material so that incident radiation is absorbed at least partially.

As the diffusing panel now scatters away electromagnetic waves, which would otherwise after emission from the exciter/receiver 3 and reflection at the parabolic reflector 2 have been immediately absorbed again by the exciter/receiver 3, the risk of overloading the receiving electronics is reduced. As the undesirable interfering radiation is scattered away or absorbed by the diffusing panel 1 (and not detected), it is possible for instance to increase dissipation capacity without having to fear overloading of the receiving electronics.

Globally, background noise of the measurement is reduced, which may lead to improved measuring results.

Moreover, the diffusing panel 1 according to the invention has rinsing outlets (not shown in FIG. 1), through which a rinsing agent for cleaning the exciter/receiver 3 may be injected, dropped, blown, or otherwise carried towards the exciter/receiver 3.

If required, the whole parabolic antenna 2, with exciter member 3 and wave guide 4, may be covered with a simple, plain protective covering, a so-called radome, which is pulled over the collar edge 9 of the parabolic antenna. This may be e.g. polytetrafluoroethylene (PTFE). Also a PTFE plate, or a possibly curved lid for covering the parabolic antenna may be provided.

Figure 2:
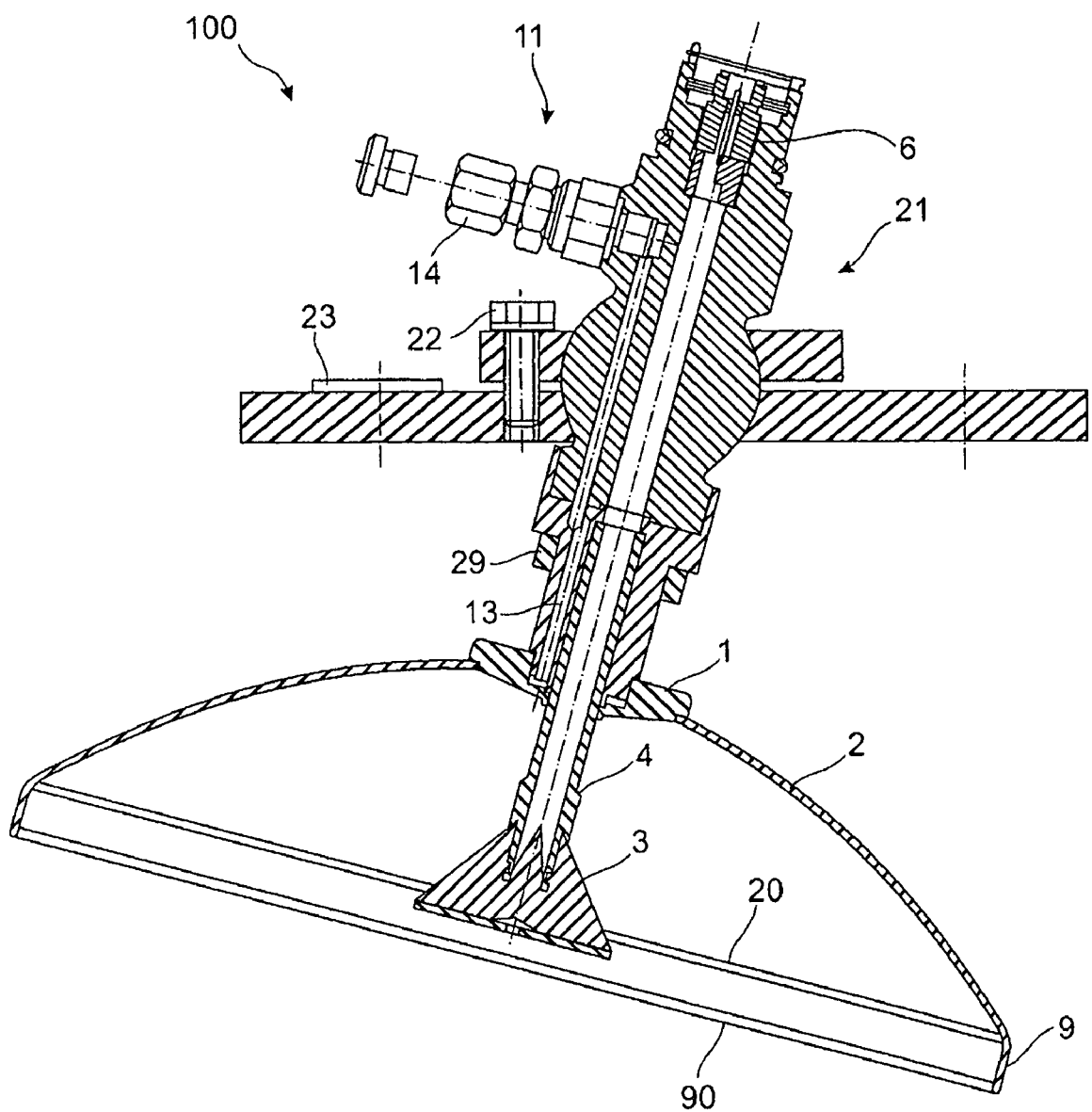
FIG. 2 shows a cross-sectional view of another parabolic antenna according to another exemplary embodiment of the present invention.

FIG. 2 shows a schematic cross-sectional view of a parabolic antenna according to another sample embodiment of the invention. The parabolic antenna shown in FIG. 2 substantially corresponds to the parabolic antenna of FIG. 1. Herein, the diffusing panel 1 is configured to be conical, consequently having an uncurved surface oriented to the incident electromagnetic radiation. Moreover, fastening members 22, 23 are provided for supporting the antenna array 100, or fastening thereof to a filling material container lid.

The rinsing device 11 has a rinsing connection 14, which is threaded so as to be fastened in the antenna coupling 21. The rinsing connection 14 is connected via the rinsing channel 13 to several rinsing outlets 12, 25, 26, 27 (see FIGS. 5 and 7).

Figure 3:
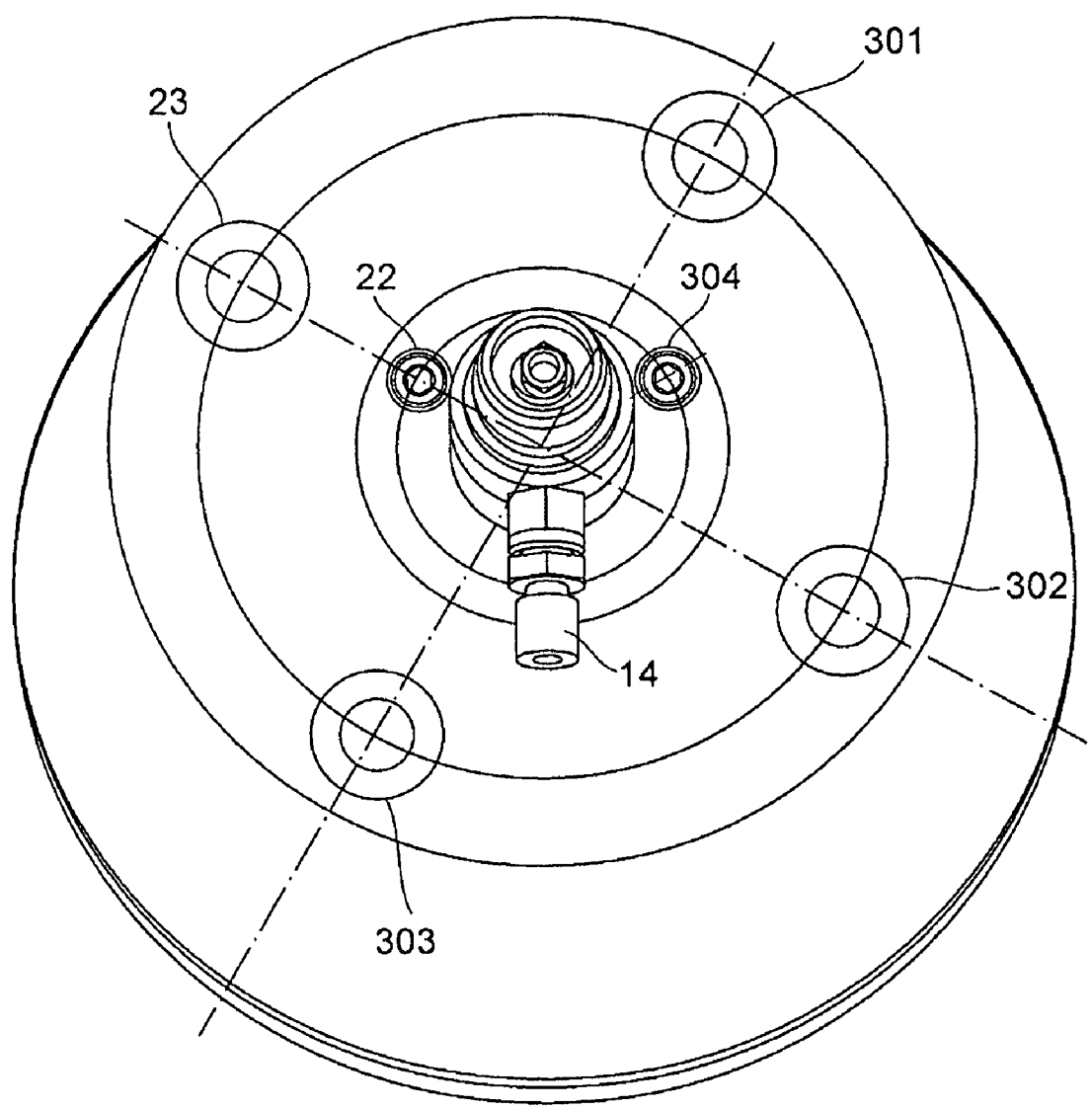
FIG. 3 shows a perspective top view of the parabolic antenna of FIG. 2.

FIG. 3 shows a perspective top view of the antenna array of FIG. 2. In particular, herein the arrangement of the fastening members 22, 23 and other fastening members 301-304 is shown.

Figure 4:
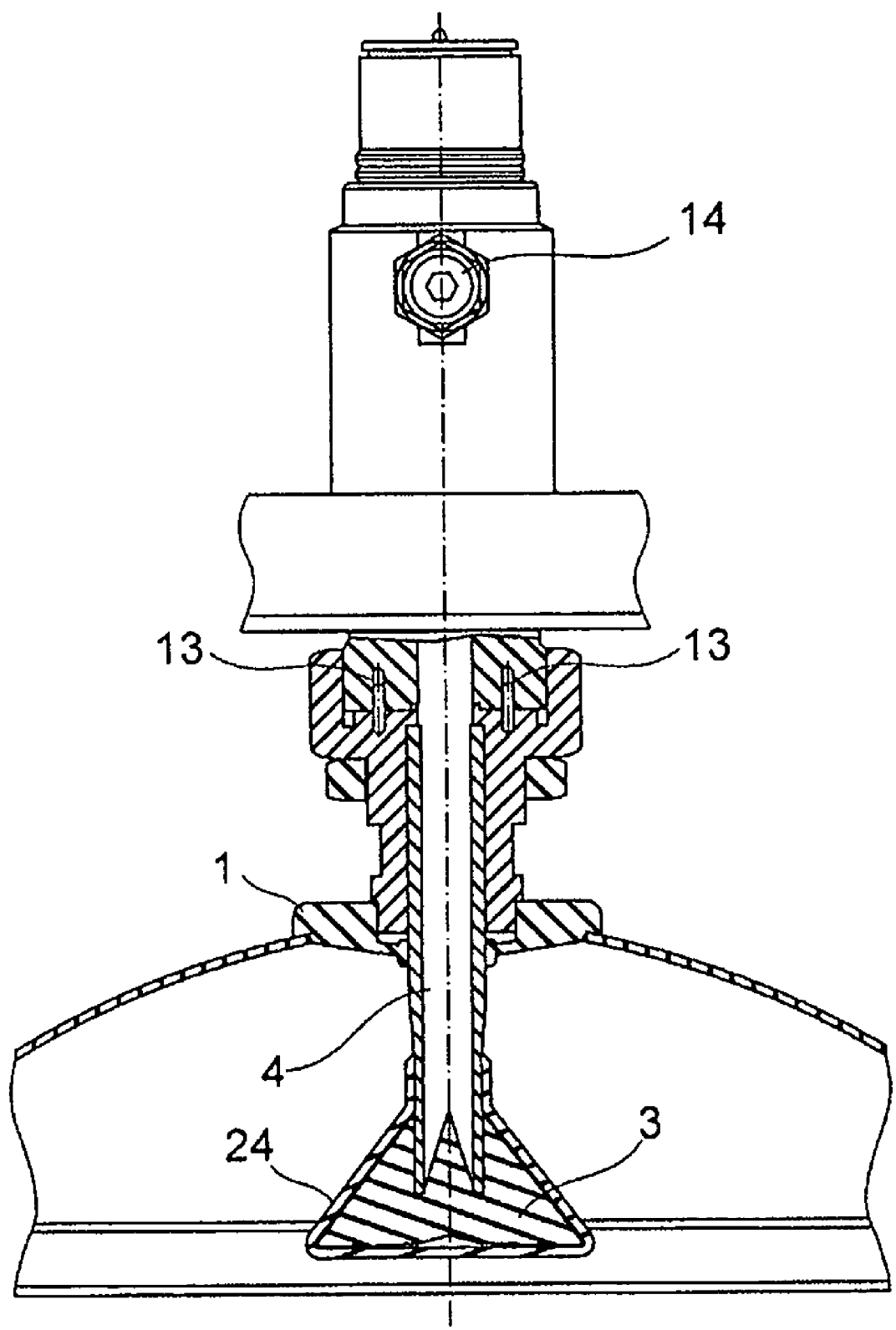
FIG. 4 shows a schematic cross-sectional view of a parabolic antenna according to another exemplary embodiment of the present invention.

FIG. 4 shows an antenna array in a schematic cross-sectional view according to another sample embodiment of the present invention. As can be seen in FIG. 4, the exciter/receiver 3 is provided with a (e.g. metallic) holding clip 24.

Figure 5:
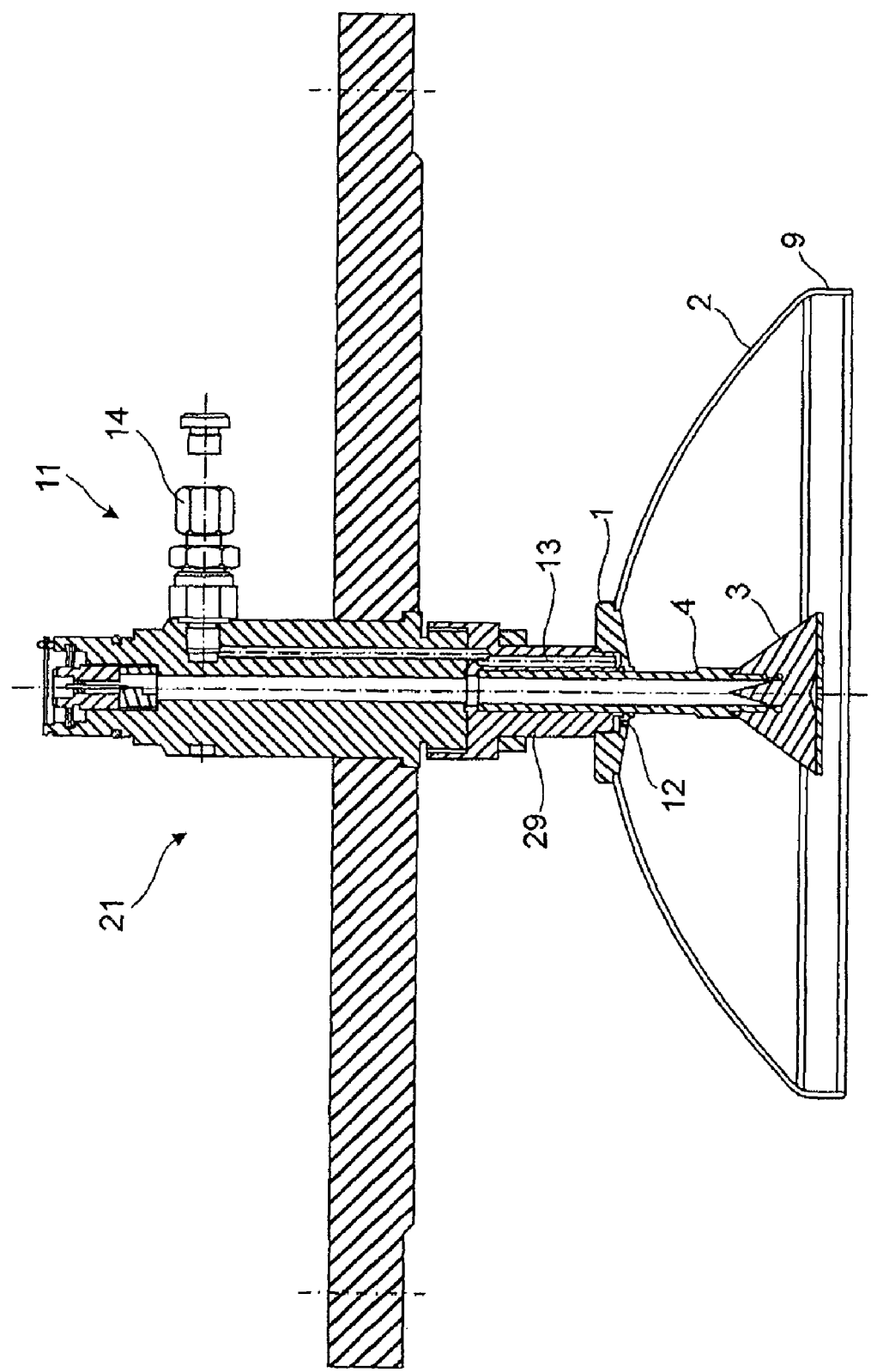
FIG. 5 shows a schematic cross-sectional view of a parabolic antenna according to another exemplary embodiment of the present invention.

FIG. 5 shows another schematic view of another sample embodiment of the present invention. As may be seen in FIG. 5, the antenna coupling 21 is placed on the antenna body 29. Inside the antenna body 29 and the antenna coupling 21 rinsing channels 13 extend, which conduct a rinsing agent from the rinsing connection 14 to the outlet 12. The outlet 12, which is configured as a bore, lies in the diffusing panel 1, which is meant for scattering away unwanted radiation. The rinsing connection 12 is implemented for cleaning the exciter/receiver 3 by means of a rinsing agent jet or for keeping the exciter/receiver 3 clean.

Figure 6:
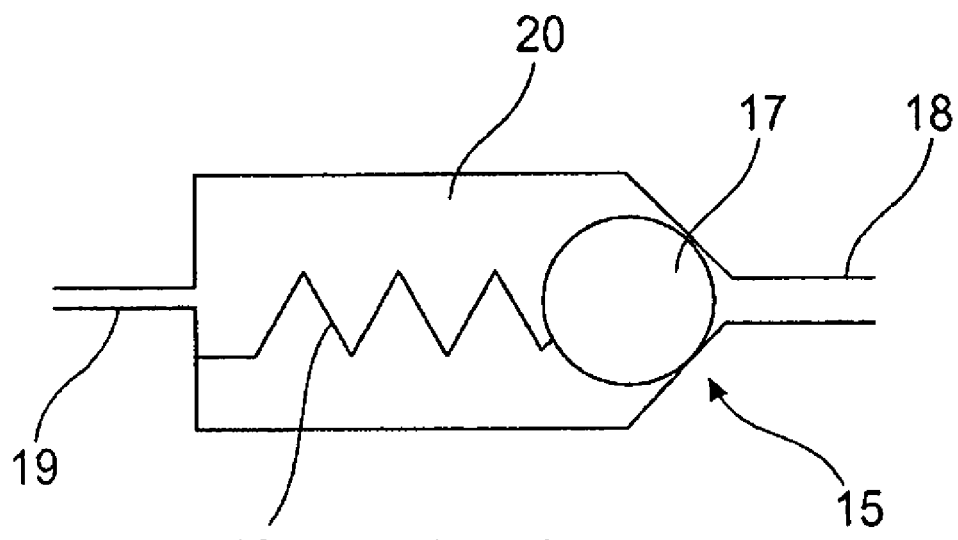
FIG. 6 shows a schematic cross-sectional view of a check valve for a rinsing device connected to the diffusing panel according to an exemplary embodiment of the present invention.

FIG. 6 shows a schematic cross-sectional view of a check valve 15 in order to prevent return mass transport. As can be seen in FIG. 6, the check valve 15 has a ball 17 and a spring 16, which are mounted in a case 20. Herein, the spring 16 pushes the ball 17 against a supply line 18, which is connected to a rinsing agent reservoir. If the pressure of the rinsing agent, which is flowing from the reservoir to the supply line 18 and pushing against the ball 17, is high enough (typically over 0.5 bar), then the spring 16 is compressed, and the ball 17 gives access to the case 20 so that the rinsing agent may flow through the case to the drain line 19. The drain line 19 is herein connected to the outlet 12. However, if the positive pressure of the rinsing agent drops below a preset threshold value, the spring 16 pushes the ball 17 against the entry of the supply line 18 so that the supply line 18 is sealed close. Further mass transport is thus prohibited. In case of ignition of an explosive gas mixture outside the container, the explosion cannot propagate into nor have an effect in the container, due to the check valve 15. This may ensure explosion protection.

Figure 7:
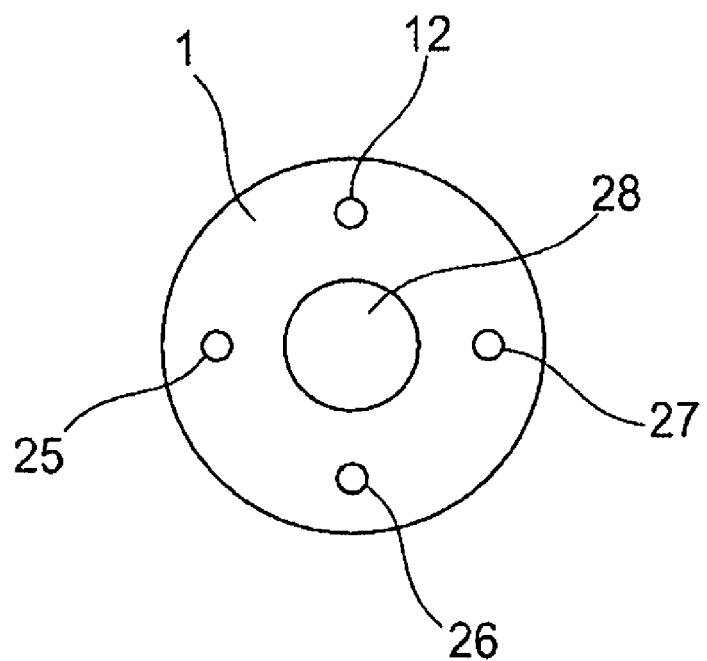
FIG. 7 shows a schematic view of a diffusing panel according to an exemplary embodiment of the present invention.

FIG. 7 shows a schematic top view of a diffusing panel 1. Herein, the diffusing panel 1 has several rinsing outlets 12, 25, 26, 27, through which the rinsing agent may be output for rinsing the exciter/receiver 3. Moreover, the diffusing panel 1 has a passage 28 for a wave guide for feeding the exciter/receiver 3. Herein, the diffusing panel 1 is configured to be conical so that electromagnetic waves, which are incident perpendicularly to the drawing plane onto the diffusing panel 1, are scattered away in a direction different from the axis of incidence. Of course, it may also be possible to provide more than four or less than four rinsing outlets.

The diffusing panel 1 is made e.g. as a separate component, and is mounted during assembly to the parabolic reflector 2, or else e.g. to the wave guide 4. Mounting may be done e.g. by bonding, welding, riveting, screwing, or crimping. Of course, the parabolic reflector 2 and diffusing panel 1 may also be configured as one piece. It may also be possible to embody diffusing panel 1 and wave guide 4 as one piece.

Additionally, it is to be noted that "comprising" does not exclude any other items or steps, and that "a" or "an" do not exclude a plurality. Furthermore, it is to be noted that features or steps having been described with reference to one of the above sample embodiments may also be used in combination with other features or steps of other embodiments described above. Reference numerals in the claims are not to be construed as limitations.

The invention claimed is:

1. A parabolic antenna for a level radar, comprising:
  a parabolic reflector;
  an exciter for emitting electromagnetic waves to the parabolic reflector;
  an outlet member; and
  a rinsing device with a rinsing outlet for rinsing the exciter with a rinsing agent;
  wherein the rinsing outlet is mounted in the outlet member,
  wherein the outlet member is mounted to the parabolic reflector,
  wherein the outlet member is embodied as a diffusing panel; and
  wherein the diffusing panel is configured for laterally removing a portion of the electromagnetic waves past the exciter.

2. The parabolic antenna according to claim 1, wherein the rinsing device has a rinsing channel; wherein the rinsing channel is configured for conducting the rinsing agent to the rinsing outlet; and wherein the rinsing outlet is configured for letting the rinsing agent out towards the exciter.

3. The parabolic antenna according to claim 1, wherein the outlet member is embodied as a ring; and wherein the ring is mounted centrically to the parabolic reflector.

4. The parabolic antenna according to claim 1, wherein the rinsing outlet is configured as a plurality of bores in the ring, which communicate with the rinsing channel.

5. The parabolic antenna according to claim 1, wherein the rinsing device has a rinsing connection; and wherein the rinsing connection is configured for connecting the rinsing device to a rinsing agent reservoir.

6. The parabolic antenna according to claim 5, wherein the parabolic antenna has an antenna coupling; and wherein the rinsing connection is threaded for screwing into the antenna coupling.

7. The parabolic antenna according to claim 5, wherein the rinsing device has a check valve; and wherein the check valve is configured for preventing return mass transport.

8. The parabolic antenna according to claim 7, wherein the check valve has a spring member and a ball.

9. The parabolic antenna according to claim 5, wherein the rinsing device has an explosion protection.

10. The parabolic antenna according to claim 5, wherein the rinsing device is configured for preventing contamination of the exciter.

11. The parabolic antenna according to claim 5, wherein the rinsing device is configured for cleaning the exciter from contamination.

12. The parabolic antenna according to claim 1, wherein the exciter comprises a Teflon cone.

13. The parabolic antenna according to claim 1, wherein the rinsing agent is selected from the group consisting of air, nitrogen and water.

14. The parabolic antenna according to claim 1, wherein the exciter emits electromagnetic waves; and wherein the parabolic reflector is configured for concentrating the electromagnetic waves.

15. The parabolic antenna according to claim 1, wherein the diffusing panel has a conical shape with a rotational axis so that a beam of parallel rays incident in the direction of the rotational axis on the diffusing panel is guided away from the rotational axis by a backscattering process.

16. A level radar, comprising a parabolic antenna according to claim 1.

17. Utilization of a parabolic antenna according to claim 1 for level measuring.

18. A method for measuring a filling level with a parabolic antenna, comprising the steps of:
  emitting electromagnetic waves to a parabolic reflector by means of an exciter;
  letting out rinsing agent to the exciter by means of a rinsing device with a rinsing outlet; and
  rinsing the exciter with the rinsing agent;
  wherein the rinsing outlet is mounted in an outlet member,
  wherein the outlet member is mounted to the parabolic reflector,
  wherein the outlet member is embodied as a diffusing panel; and
  wherein the diffusing panel is configured for laterally removing a portion of the electromagnetic waves past the exciter.

19. The method according to claim 18, further comprising the step of: introducing the rinsing agent from a rinsing agent reservoir into a rinsing-connection of the rinsing device.

20. The method according to claim 18, further comprising the step of: guiding the rinsing agent from the rinsing connection to the rinsing outlet through a rinsing channel.

21. The method according to claim 18, wherein the rinsing device has a check valve; and wherein the check valve is configured for preventing return mass transport.

22. The method according to claim 21, wherein the check valve has a spring member and a ball.

23. The method according to claim 18, wherein the rinsing device has an explosion protection.

* * * * *